Aug. 31, 1948.　　　　O. J. MORELOCK　　　　2,448,452
TEST SOCKET
Filed Dec. 21, 1945　　　　　　　　　　　　　　　2 Sheets-Sheet 1
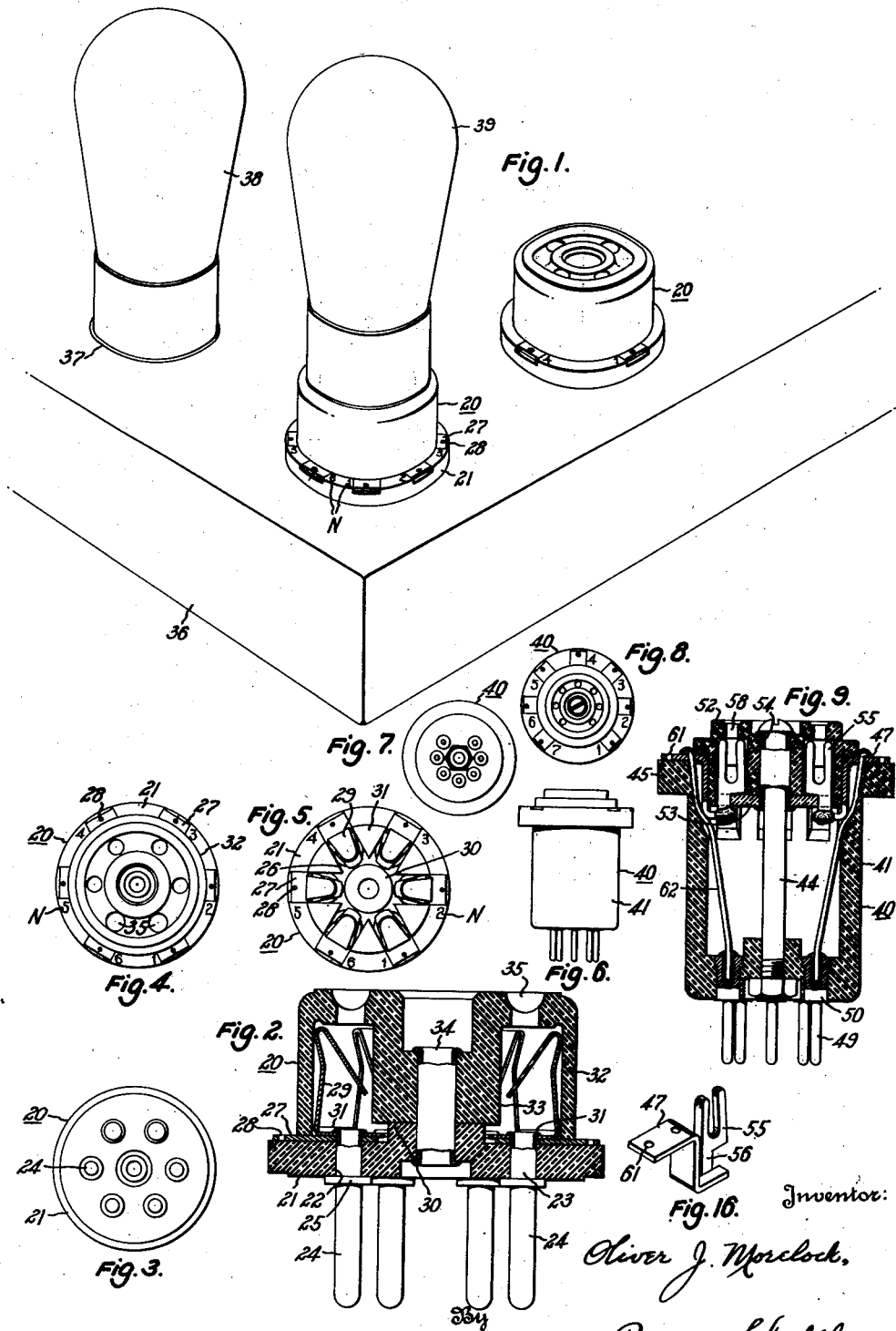

Aug. 31, 1948.                O. J. MORELOCK                2,448,452
                                 TEST SOCKET
Filed Dec. 21, 1945                                    2 Sheets-Sheet 2
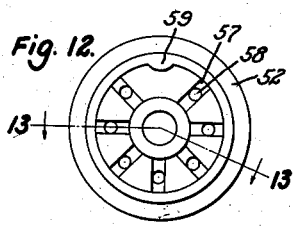
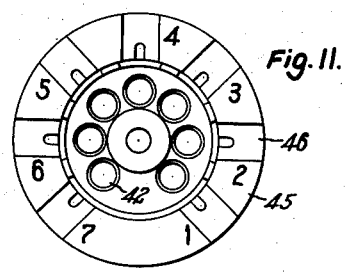
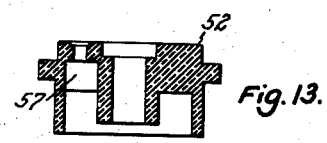
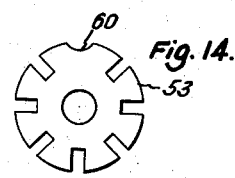
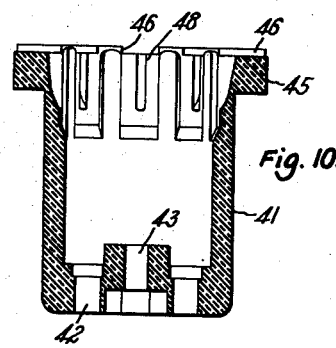
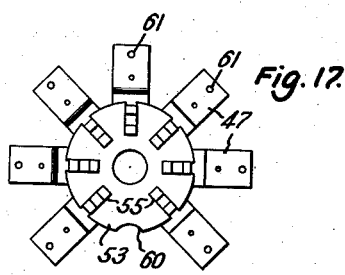
Inventor:
Oliver J. Morelock,
By Pierce & Scheffler,
Attorneys.

Patented Aug. 31, 1948

2,448,452

UNITED STATES PATENT OFFICE 2,448,452

TEST SOCKET

Oliver James Morelock, Short Hills, N. J., assignor to Weston Electrical Instrument Corporation, Newark, N. J., a corporation of New Jersey Application December 21, 1945, Serial No. 636,456

6 Claims. (Cl. 173—344)

This invention relates to test sockets for facilitating the testing of electronic devices such as radio receivers and/or radio tubes, and more particularly to test sockets having exposed electrical contacts that are inserted between a radio tube and its normal socket to permit electrical circuit connections to be established to the several pin terminals of the tube from the top of the chassis on which the tube is mounted.

An object of the invention is to provide a test socket that permits testing of the radio equipment from the upper part of the chassis.

Another object is to provide a test socket peculiarly suited to testing interelectrode potentials in high frequency radio circuits by virtue of a construction exhibiting the characteristics of low inductance and low interelectrode capacity.

Another object is to provide in such a test socket an exposed test tab that will minimize hazards of short circuiting when the tube is inserted in or removed from a test socket temporarily introduced into the radio receiver for test purposes.

Still another object is to provide a simply constructed, sturdy and cheaply manufactured device of this character which will give exceptionally long service life.

Other objects and advantages of the invention will in part be apparent and in part pointed out in the following detailed description of two embodiments thereof taken in connection with the accompanying drawings, wherein:

Fig. 1 is a perspective view of part of a radio chassis showing test sockets according to the invention plugged into the tube sockets;

Fig. 2 is an enlarged vertical sectional view through one embodiment of the test socket;

Figs. 3 and 4 are, respectively, bottom and top views of the socket sectionalized in Fig. 2;

Fig. 5 is a top view of the base portion of the socket, the cap portion having been removed;

Figs. 6, 7 and 8 are, respectively, side, bottom and top views of another test socket embodying the invention;

Fig. 9 is an enlarged vertical sectional view of the socket shown in Figs. 6 through 8;

Figs. 10 through 16 are views of various component parts of the socket; and

Fig. 17 is a top view of a sub-assembly of the device.

In the several figures of the drawing, identical parts are designated by the same reference numeral.

Test sockets in accordance with the present invention include an insulating base and pins carried thereby to form a plug, and an insulating cap superimposed upon the base and fastened thereto, the top of the base extending outwardly beyond the cap to form a ledge, the cap and base providing an inclosed space from which a plurality of test tabs project outwardly between the cap and base. Each tab is electrically connected to one of the socket pins and thereby to one of the electrodes of the tube that is mounted in the test socket. The tabs are carried by the ledge formed at the top of the base, they terminate approximately at the periphery of the ledge and are exposed on their upper surfaces for the application of a test prod. The tabs may have flat upper surfaces and each may be provided with a small indentation or hole for the reception of the point of a test prod to prevent slipping of the latter during testing. Within the space in the socket are mounted a plurality of contact elements, each being electrically connected to one of the socket pins. The cap has a plurality of holes in its top aligned with the contact elements for the reception of the pin terminals of a radio tube.

Referring to Figs. 2 through 5 of the drawing, there is shown a test socket generally designated 20. The socket has a disc shaped base 21 made of insulating material, preferably a moldable plastic composition such as a thermosetting resin. The base is provided with holes 22 in which are fitted the shanks 23 of the contact pins 24. The pins 24 may be, and preferably are, of conventional tubular design with collars 25 seated against the lower surface of the base 21 and having upper ends spun or swaged over to anchor the contact pins to the base 21.

As best seen in Fig. 5, a plurality of slots or recesses 26 are formed in the top of the base extending radially outwardly from each prong to the edge of the base. A metallic test tab 27 is received in each slot and each tab preferably has a small hole 28 located near its outer end in which the point of a test prod may be rested to prevent slipping of the prod during testing.

Spring connectors 29 are mounted on the respective tabs 27, and the shanks 23 of the pins 22 extend through the several assemblies of tabs and connectors as shown, to secure the pins, tabs and spring connectors mechanically to the base and to effect a mutual electrical connection between these three components.

The base has a central boss 30 and sector shaped lands 31 which engage the sides of the spring connectors 29 to prevent their turning about the shanks of the pins.

The socket assembly has a cap 32 of insulating material, the cap being in the form of an inverted cup having a central depending cylindrical boss 32. When the cap is assembled to the base, as shown, the bosses 33 and 30 are mutually engaged providing, in effect, a central column lending rigidity and strength to the socket assembly. A rivet 34 fastens the cap to the base. It will be observed that the bottom of the side wall of the cap rests upon the top of the base and that the base extends outwardly beyond the cap to form a ledge readily accessible from above. The outer ends of the test tabs 27 are exposed upon this ledge and terminate at or just short of the periphery of the base 21 (see Fig. 2) to prevent short-circuiting of an electrode circuit when inserting the test socket in the base of a shield can. Numerals N are impressed in or printed on the base to identify the several tabs according to the conventional code designation of the several tube electrodes.

A series of openings 35, corresponding in number to and aligned with the pins 22 are provided in the top of the cap and lead into the annular space within the socket for the reception of the prongs of a radio tube or the like to be tested.

The method of using the test socket will now be described with reference to Fig. 1, in which there is shown a radio chassis 36 provided with the usual flush-mounted sockets 37 for receiving the tubes 38, 39, and/or vibrators, transformers and the like, not shown. The tube 38 is illustrated as mounted in its socket 37, but tube 39 is illustrated as mounted in the test socket 20 which, in turn, is mounted in the normal socket of the tube 39. A second test socket 20 is shown as mounted in another chassis socket to receive the tube or other plug-in element which is normally mounted in that chassis socket.

The method of employing the test or adapter sockets will be apparent from an inspection of Fig. 1. The adapter sockets are positioned between the chassis sockets and one or more of the tubes or other plug-in elements of the apparatus to permit measurement of the potentials or the resistances between electrodes or between an electrode and the chassis from the top of the chassis. This results in a substantial reduction in the time required for any given series of measurements and has the further advantage of eliminating the possibility of damage to the measuring apparatus or to the apparatus under test through errors in identifying the socket terminals at the lower surface of the chassis and through inadvertent short-circuiting of leads by the test probe. It is to be noted that test sockets have a minimum inductance and minimum inter-electrode capacity, and that the test sockets may therefore be used in the checking of radio and television apparatus operating at high frequencies. The short test tabs 27 terminate at or short of the socket flange 21, and thereby eliminate the possibility of short-circuiting when the test sockets are inserted in the bases of shield cans and/or when shield cans are placed over the tubes when inserted in the test sockets.

Another embodiment of the invention, as illustrated in Figs. 6 to 17, permits voltage and resistance measurements with respect to miniature tubes which are mounted in a recessed socket. The miniature socket 40 includes a cup-shaped base 41 which is shown on an enlarged scale in vertical section and in top plan respectively in Figs. 10 and 11. The base has a series of pin holes 42 and a central opening 43 to receive the assembling bolt 44. The top flange 45 of the base 41 has radial recesses 46 for receiving the outer ends of test tabs 47 of angular form with axially extending inner ends seated within recesses 48 in the inner circumferential wall of the base 41. Socket pins 49 have enlarged diameter shanks inserted through the pin holes 42 and secured thereto by staking over the lower ends of the shanks 50. A cap member 52 has a downwardly extending cylindrical skirt across which the radially slotted disc 53 is secured by a hollow rivet 54, and this cap assembly is telescoped into and secured to the base 41 by a bolt 44. Forked and resilient contact elements 55 have tails which extend through the radial slots of the disc 53, the upper or forked portions 55 being snugly received in radially extending recesses 57 in the lower surface 52, these recesses being in axial alinement with openings 58 through the top of the cap 52. Proper orientation of the cap and disc is ensured by the mating of a rib 59 at the interior of the cap and a recess 60 in the periphery of the disc. The outer ends of the test tabs 47 have small recesses or perforations 61 to receive the tip of a test prod, and the inner ends of the tabs are slotted, see Fig. 16, to receive the lower or tail sections 56 of the resilient contacts. Connecting wires 62 have lower ends soldered into the bores of the shanks 50 of the pins 49 and upper ends soldered to the test tabs 47 which in turn are soldered to the terminals 55. This construction results in the wire leads 62 being straight and taut (see Fig. 9) resulting in a minimum interterminal capacity and inductance making the sockets usable at high frequency currents.

As in the case of the device shown in Figs. 2 through 5, the tabs of the miniature test socket terminate at or just inside the edge of ledge 45 whereby to eliminate the possibility of short circuiting when the socket is being placed in or removed from a radio chassis.

It will be understood that the specific embodiments of the test sockets herein shown and described are illustrative of the invention and that other embodiments within the scope of the appended claims will occur to those skilled in the art to which this invention pertains.

I claim:

1. A test socket for electronic devices which comprises an insulating base; pins carried by said base and forming a plug; an insulating cap superimposed upon said base and fastened thereto, the top of said base extending outwardly beyond said cap forming a ledge, said cap and base providing an inclosed space; a plurality of test tabs projecting outwardly from said inclosed space between said cap and said base, each tab being electrically connected to one of said pins, said tabs being carried in recesses formed in the upper surface of said ledge and terminating a short distance from the edge of said ledge and being exposed on their upper surfaces for the application of a test prod; a plurality of contact elements in said inclosed space, each element being electrically connected to one of said pins, said cap having a plurality of holes in its top aligned with said contact elements for the reception of the pins of a radio tube or the like.

2. A test socket for electronic devices as defined in claim 1 wherein the exposed upper surfaces of said test tabs are flat and are provided each with a small recess in which the point of a test prod may be inserted, whereby the test prod is prevented from slipping.

3. A test socket for electronic devices which comprises a substantially cylindrical insulating base; pins mounted in and extending through said base forming a plug; a substantially cylindrical insulating cap having a diameter somewhat smaller than the diameter of said base superimposed upon said base and fastened thereto, the top of said base extending outwardly beyond said cap forming a ledge, said cap and base providing an inclosed space; a plurality of metallic test tabs projecting outwardly from said inclosed space between said cap and said base, electrical elements in said space connecting each of said tabs with one of said pins, said tabs being carried in recesses formed in the upper surface of said ledge and terminating a short distance from the edge of said ledge and being exposed on their upper surfaces for the application of a test prod; a plurality of contact elements mounted in said inclosed space, each contact element being electrically connected in said space to one of said pins, said cap having a plurality of holes in its top aligned with said contact elements for the reception of the pins of a radio tube or the like.

4. A test socket for electronic devices as defined in claim 3 wherein the exposed upper surfaces of said test tabs are flat and are provided each with a small recess in which the point of a test prod may be inserted, whereby the test prod is prevented from slipping.

5. A test socket for electronic devices which comprises a substantially disc-shaped insulating base; pins mounted in and extending downwardly through said base forming a plug; a substantially cylindrical inverted cup-shaped insulating cap having a diameter somewhat smaller than the diameter of said base superimposed upon said base and fastened thereto; the top of said base extending outwardly beyond the bottom of said cap forming a ledge, said cap and base providing an inclosed space; a plurality of metallic test tabs projecting outwardly from said inclosed space between said cap and said base, the inner end of each tab being mechanically and electrically connected with the upper end of one of said pins, said tabs being carried in radially extending recesses formed in the upper surface of said base and terminating a short distance from the edge of said ledge and being exposed on their upper surfaces for the application of a test prod; a plurality of upstanding spring contact elements in said inclosed space, each element being fastened to and in electrical contact with the upper end of one of said pins, said cap having a plurality of holes in its top aligned with said contact elements for the reception of the pins of a radio tube or the like.

6. A test socket for electronic devices which comprises a cup-shaped insulating base having an out-turned flange at its top; pins mounted in and extending downwardly through the bottom of said base forming a plug; a cap assembly including an insulating cap closing the top of said cup-shaped base, said cap having a substantially flat top, a flange overlying the flange of said base and a depending cylindrical skirt received in the top opening of said base, said base flange extending outwardly beyond said cap flange forming a ledge; a disc having openings therein secured to said cap and substantially closing the opening at the bottom of the skirt; a plurality of contact elements carried by said disc extending above said disc and each having a conducting portion extending downwardly through one of the openings in said disc; a plurality of metallic test tabs each having one end mechanically and electrically connected to the downwardly extending conducting portion of one of said contact elements, each tab extending outwardly, upwardly along said cap skirt and again outwardly beneath said cap flange; means fastening said cap assembly to said base; said base, including said ledge, being provided with recesses for receiving said tabs, the outer ends of said tabs terminating a short distance from the edge of said ledge; electrical conductors connecting said tabs and contact elements with the upper ends of said pins; said cap having a plurality of holes in its top aligned with said contact elements for the reception of the pins of a radio tube or the like.

OLIVER JAMES MORELOCK.

REFERENCES CITED

The following references are of record in the file of this patent:

UNITED STATES PATENTS

| Number | Name | Date |
|--------|------|------|
| 1,805,783 | Olsen | May 19, 1931 |
| 1,819,805 | Zuckerman | Aug. 18, 1931 |